United States Patent [19]

Nara et al.

[11] 3,725,474
[45] Apr. 3, 1973

[54] METHOD FOR SEPARATING CITRIC ACID

[75] Inventors: Kiyoshi Nara, Kyoto; Kazuhiko Ohta, Osaka; Kazuyoshi Katamoto, Osaka; Osami Yamazaki, Osaka; Hideo Fukuda, Osaka, all of Japan

[73] Assignee: Takeda Chemical Industries, Ltd., Osaka, Japan

[22] Filed: Sept. 25, 1970

[21] Appl. No.: 75,328

[30] Foreign Application Priority Data

Sept. 25, 1969 Japan .................................. 44/76400

[52] U.S. Cl. ............................ 260/535 P, 260/527
[51] Int. Cl. ........................................... C07c 59/16
[58] Field of Search ................................. 260/535 P

[56] References Cited

FOREIGN PATENTS OR APPLICATIONS 435,586  9/1935  Great Britain .................... 260/535 P Primary Examiner—Lorraine A. Weinberger
Assistant Examiner—Paul J. Killos
Attorney—Wenderoth, Lind & Ponack

[57] ABSTRACT

Citric acid is removed as tricalcium citrate from an aqueous fluid containing water soluble salts of citric acid and (+)-isocitric acid. To the aqueous fluid is added from about 0.4 to about 0.8 equivalent relative to citric acid of an inorganic calcium compound to precipitate the tricalcium citrate which is recovered from the fluid.

2 Claims, 1 Drawing Figure

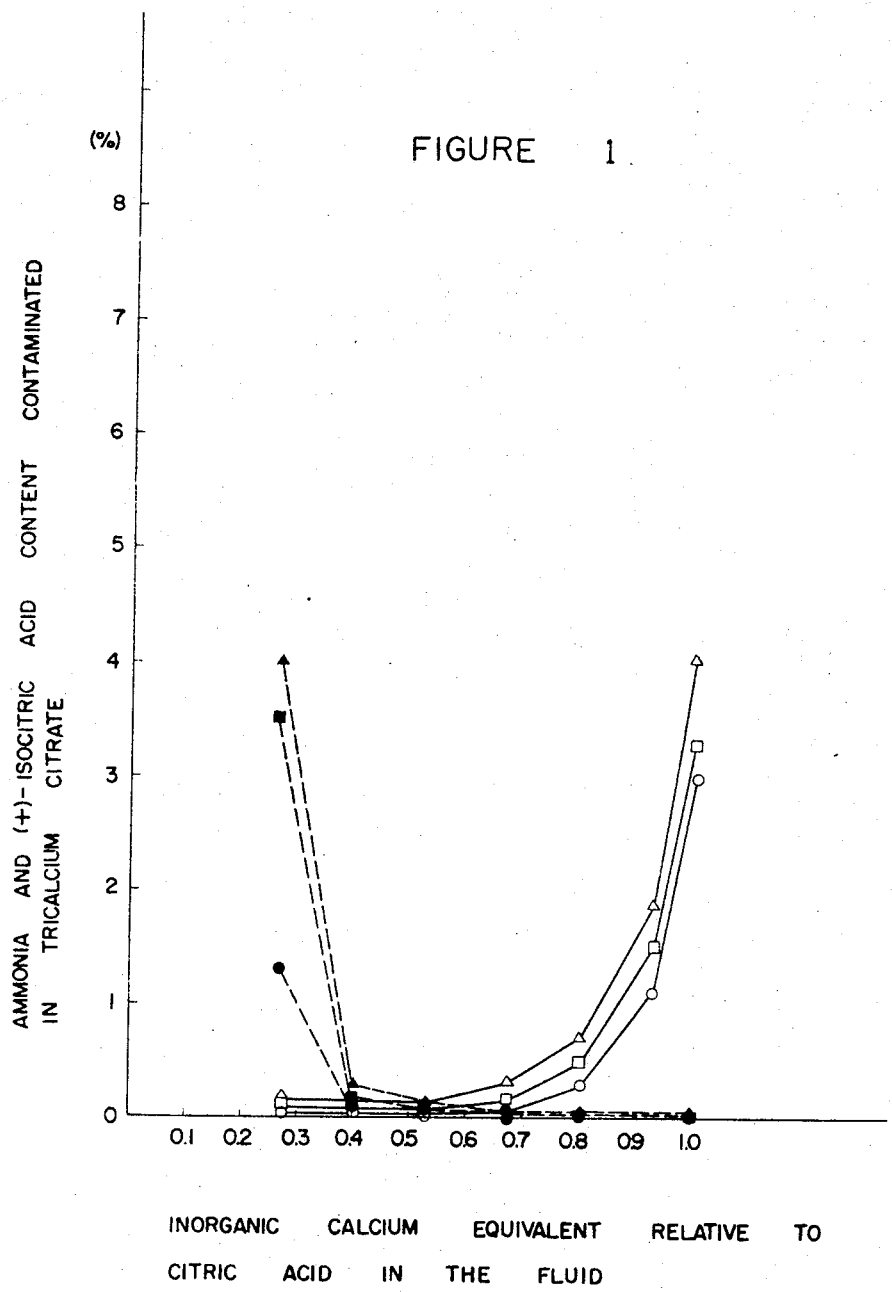

METHOD FOR SEPARATING CITRIC ACID

This invention relates to a process for separating citric acid as tricalcium citrate from (+)-isocitric acid.

Citric acid is of great demand as a sour flavoring. This acid has heretofore been produced by the cultivation of a certain species of mold and recovered from the cultured broth by precipitating the same as calcium mono-hydrogen citrate or tricalcium citrate.

Recently published Belgian Pat. No. 725,417 describes an improved process for the large scale production of citric acid and (+)-isocitric acid by a certain yeast. According to this process, however, considerable amount of (+)-isocitric acid is accumulated at the same time and it is necessary to separate citric acid from (+)-isocitric acid by a series of troublesome procedures including column chromatography, which requires quite a long time and complicates the process.

In an attempt to overcome the drawback of said process, the present inventors have carried out an intensive study and obtained the following findings:

1. a certain yeast accumulates citric acid and (+)-isocitric acid in a form of their water-soluble salts, when incubated in a medium controlled at pH 3 to 8 with a proper pH regulator,
2. as such a regulator, use is made of ammonia, sodium hydroxide, etc.,
3. when a certain amount of an inorganic calcium compound (e.g., calcium hydroxide) is added to the above obtained cultured broth after removal of the yeast cells, only citric acid is precipitated as tricalcium citrate and (+)-isocitric acid remains dissolved in the cell-free fluid.

These findings are quite unpredictable for the reason as disclosed in the following pages. The present invention is based on these findings and is of practical use in large scale production.

Thus, the present invention relates to a process for separating citric acid as tricalcium citrate from (+)-isocitric acid, which comprises adding an inorganic calcium compound to an aqueous fluid containing water-soluble salts of citric acid and (+)-isocitric acid, said calcium compound being added in an amount of about 0.4 to about 0.8 equivalent relative to citric acid to thereby precipitate tricalcium citrate, and recovering the tricalcium citrate thus precipitated from the fluid.

The said aqueous solution which contains water soluble salts of citric acid and (+)-isocitric acid can be obtained according to the process disclosed in Belgian Pat. No. 725,417, with the employment of a proper pH-regulator to keep the culture broth at a pH about 3 to about 8 and at the same time to form water soluble salts with citric acid and (+)-isocitric acid.

Thus, as pH regulators, use is made of ammonia, sodium hydroxide, potassium hydroxide, etc. Among these regulators, strong alkalis such as sodium hydroxide or potassium hydroxide are disadvantageous in that they have deleterious effects on the microbial cells.

In contrast, ammonia does not form insoluble compounds with citric acid and (+)-isocitric acid and does little harm to the yeast cells and is thus the most recommended pH-regulator.

The cultured broth is subjected to centrifugation or filtration to remove yeast cells and to give the aforementioned aqueous fluid, which contains citric acid and (+)-isocitric acid in a form of their ammonium salts.

In the present invention, an inorganic calcium compound is added to the said aqueous fluid in an amount of about 0.4 to about 0.8 equivalent relative to citric acid to precipitate citric acid in a form of tricalcium citrate.

Tricalcium citrate is only very sparingly soluble and can be dissolved to a concentration of 0.096g in 100g. of water at 25°C. On the other hand, according to the present inventors' experiment, tricalcium (+)-isocitrate is also soluble only to the extent of 0.73g. relative to 100g. of water. Therefore, at first the present inventors considered it very difficult to separate the tricalcium salts of citric acid and (+)-isocitric acid which would precipitate on addition of an inorganic calcium compound.

In fact, if an inorganic calcium compound is added in an amount equivalent to the ammonium citrate formed, both tricalcium citrate and tricalcium (+)-isocitrate are simultaneously precipitated so that they can not be separated from each other.

However, if the amount of said inorganic calcium compound lies within the range of about 0.4 to about 0.8 equivalent of the ammonium citrate, an extremely pure form of tricalcium citrate is precipitated regardless of the ratio of the salts of citric acid and (+)-isocitric acid dissolved in the aqueous fluid, while substantially no tricalcium (+)-isocitrate is contaminated therein. It has also been discovered that according to the instant method there is precipitated no ammonium-calcium double salt of citric acid and (+)-isocitric acid. This is a totally unexpected finding in light of the proportion of the inorganic calcium compound relative to the ammonium citrate present in the aqueous fluid, and it is considered that a very singular reaction is involved. However, the ammonium-calcium double salt of citric acid is precipitated in addition to tricalcium citrate when the proportion of said inorganic calcium compound is less than about 0.4 equivalent of ammonium citrate. Those relations are illustrated in FIG. 1.

The lines in FIG. 1 indicate as follows:

| Citric acid/(+)-isocitric acid dissolved in the aqueous fluid (ml.) | Contamination of ammonia and (+)-isocitric acid in the precipitated tricalcium citrate | |
|---|---|---|
| | Ammonia | (+)-isocitric acid |
| 70 mg./30 mg. | ● ····· ● | ○――――○ |
| 70 mg./70 mg. | ■ ····· ■ | □――――□ |
| 70 mg./165 mg. | ▲ ····· ▲ | △――――△ |

Ammonium-calcium citrate gives rise to ammonium sulfate when sulfuric acid is added in a subsequent purification step in order to convert the citrate to the corresponding free acid.

Thus-formed ammonium salt gives disadvantage to the process since it is as readily soluble as citric acid and can not be separated from the latter.

On the other hand, tricalcium citrate gives rise to water-insoluble calcium sulfate on addition of sulfuric acid, with the result that citric acid can be easily separated in a free form.

Therefore, it is commercially very important to recover citric acid in the form of pure tricalcium salt.

As is clear from FIG. 1, substantially pure tricalcium citrate can be obtained only by adding about 0.4 to about 0.8 equivalent of an inorganic calcium compound to the cell-free fluid relative to citric acid present in said fluid.

Incidentally, the formation of tricalcium citrate may be accelerated by heating, desirablly not less than at 60°C.

By repeating the above-described procedure, it is possible to recover substantially all the ammonium citrate from the broth in the form of tricalcium citrate.

The aforesaid inorganic calcium salt may, for example, be calcium hydroxide, quick lime, calcium carbonate or calcium chloride.

If desired, the tricalcium citrate obtained may be treated with sulfuric acid to obtain free citric acid.

On the other hand, (+)-isocitric acid is easily recovered from the mother liquor after the recovery of tricalcium citrate by a series of following procedures:

1. Precipitation as tricalcium (+)-isocitrate on addition of an excessive inorganic calcium salt,
2. removal of calcium by the addition of sulfuric acid, and if desired
3. reprecipitation as potassium (+)-isocitrate by the addition of an inorganic potassium compound.

The following examples are merely illustrative of this invention and should by no means be construed as being limitative of the scope of the invention.

In the following examples, parts by weight bear the same relation to parts by volume as do gram(s) to milliliter(s).

EXAMPLE 1

*Candida sp.* (ATCC 20238) is inoculated in a medium containing n-hexadecane (8%), $NH_4Cl$(0.3%), $KH_2PO_4$(%), $MgSO_4$(0.05%) and vitamin $B_1$(50γ/l.), and incubated at 28°C for 72 hours, with the medium being adjusted to pH 6.5 with ammonia from time to time. To 100 parts by volume of a filtrate, which is obtained upon removal of the yeast cells from the cultured broth and contains citric acid (83mg./ml.) and (+)-isocitric acid (18mg./ml.), 3.3 parts by weight of calcium hydroxide (0.67 equivalent of citric acid) is added. The reaction is allowed to proceed at 85°–90°C for 2 hours, at the end of which time the precipitated calcium salt is recovered by filtration, then washed with water and dried. The procedure gives 7.3 parts of weight of white powder. Analysis of this powder reveals the presence of calcium (21.3%), citric acid (67.1%) and water (11%). Besides those constituents, the powder contains 0.5 percent each of ammonia and (+)-isocitric acid.

A substantially similar result is obtained when an equivalent of quick lime is added instead of calcium hydroxide.

To recover (+)-isocitric acid from the mother liquor obtained as described above, 2.0 parts by weight of calcium hydroxide is added and the reaction is allowed to proceed at 85°–90°C for 2 hours, whereby the calcium salt composed of (+)-isocitric acid moiety and residual citric acid.

The precipitate is recovered by filtration when hot, washed with hot water and treated with sulfuric acid, whereupon a solution of (+)-isocitric acid and citric acid is obtained. The solution is brought to pH 3.5 with potassium hydroxide and concentrated at a low temperature whereupon monopotassium (+)-isocitrate separates out, while monopotassium citrate remains dissolved. After cooling, the monopotassium (+)-isocitrate is isolated and dried.

The above procedure gives 1.0 part by weight of monopotassium (+)-isocitrate.

The pH of the mother liquor is adjusted to 6.5 with ammonia, whereby monopotassium citrate in the liquor is converted to ammonium citrate, which precipitates as calcium salt of citric acid on addition of an inorganic calcium compound.

EXAMPLE 2

To 100 parts by volume of the cell free liquor containing citric acid (83mg./ml.) and (+)-isocitric acid (18mg./ml.), which is obtained in Example 1, there is added 4.4 parts by weight of calcium carbonate, (0.68 equivalent of citric acid) and the reaction is allowed to proceed at 85°–90°C and under slightly reduced pressure (500mmHg) for 2 hours. The resulting calcium salt is recovered by filtration, washed with water and dried, whereupon 7.2 parts by weight of white powder is obtained. Analysis of the powder reveals the presence of calcium (21%), citric acid (67%), and water (11%).

Aside from those constituents, the powder contains no more than 0.5 percent each of ammonia and (+)-isocitric acid.

In the same manner as Example 1, (+)-isocitric acid is recovered from the mother liquor.

EXAMPLE 3

*Candida lipolytica* (ATCC 20114) is inoculated in a medium containing n-hexadecane (4%), $KH_2PO_4$(0.05%), $NgSO_4$(0.05%) and yeast extract (0.1%), and incubated at 28°C for 72 hours, with the medium being adjusted to pH 6.5 with ammonia.

To 200 parts by volume of filtrate, which is obtained upon removal of the yeast cells from the cultured broth and contains citric acid (34mg./ml.) and (+)-isocitric (23 mg./ml.), 2.8 parts by weight of calcium hydroxide (0.71 equivalent of citric acid) is added. The reaction is allowed to proceed at 85°–90°C for 2 hours, at the end of which time the precipitated calcium salt is recovered by filtration, washed with water and dried.

The procedure gives 6.1 parts by weight of white powder. Analysis of the powder reveals the presence of calcium (21%), citric acid (67%), and water (11%). The powder contains less than 0.2 percent each of ammonia and (+)-isocitric acid.

To recover (+)-isocitric acid, the mother liquor is subjected to the same procedure as in Example 1.

EXAMPLE 4

*Candida sp.* (ATCC 20180) is inoculated in a medium containing glucose (14%), $NH_4CL$(0.1%), $KH_2PO_4$(%), $MgSO_4·7H_2O$ (0.05%), corn steep liquor (0.3%) and incubated at 28°C for 72 hours, at pH 6.5 controlled with ammonia.

To 100 parts by volume of filtrate, which is obtained upon removal of the yeast cells from the cultured broth and contains citric acid (36mg./ml.) and (+)-isocitric acid (33mg./ml.), 1.6 part by weight of calcium hydroxide (0.76 equivalent of citric acid) is added. The reaction is allowed to proceed at 85°–90°C for 2 hours, at the end of which time the precipitated calcium salt is recovered by filtration, washed with water and dried. This procedure gives 3.8 parts by weight of white powder. Analysis of this powder reveals the presence of calcium (21%), citric acid (67%), and water (11%). Besides those constituents, the powder contains ammonia (0.12%), and (+)-isocitric acid (0.20%).

What we claim is:

1. A process for separating citric acid as tricalcium citrate from (+)-isocitric acid which comprises adding an inorganic calcium compound to an aqueous fluid containing water soluble salts of citric acid and (+)-isocitric acid said compound being added in an mount of about 0.4 to about 0.8 equivalent relative to citric acid to precipitate tricalcium citrate and recovering the thus precipitated tricalcium citrate from the fluid.

2. A process according to claim 1, wherein said inorganic calcium compound is a member selected from the group consisting of calcium hydroxide, quick lime, calcium carbonate and calcium chloride.

* * * * *